United States Patent [19]
Mark et al.

[11] Patent Number: 5,896,199
[45] Date of Patent: Apr. 20, 1999

[54] HIGH EFFICIENCY MAGNETIC SHIELD FOR A FIBER OPTIC GYROSCOPE

[75] Inventors: John G. Mark, Pasadena; Daniel A. Tazartes, West Hills; Amado Cordova, West Hills; Agop H. Cherbettchian, Santa Monica; Eric L. Goldner, Valencia, all of Calif.

[73] Assignee: Litton Systems, Inc., Woodland Hills, Calif.

[21] Appl. No.: 08/880,129

[22] Filed: Jun. 20, 1997

Related U.S. Application Data

[XX .
[60] Provisional application No. 60/022,696, Jul. 26, 1996.
[51] Int. Cl.$^6$ ............................................. G01C 19/72
[52] U.S. Cl. ............................................. 356/350
[58] Field of Search ............................ 356/350, 345; 250/227.19, 227.27; 242/333.6

[56] References Cited

U.S. PATENT DOCUMENTS

| | | | |
|---|---|---|---|
| 4,299,490 | 11/1981 | Cahill et al. | 356/350 |
| 4,671,658 | 6/1987 | Shaw et al. | 356/350 |
| 4,699,451 | 10/1987 | Mohr | 356/350 |
| 4,711,575 | 12/1987 | Butler | 356/350 |
| 5,245,687 | 9/1993 | Usui | 356/350 |
| 5,416,585 | 5/1995 | Hadeler | 356/350 |
| 5,444,534 | 8/1995 | Dyott et al. | 356/350 |
| 5,486,922 | 1/1996 | Cordova | 356/350 |
| 5,545,892 | 8/1996 | Bilinski et al. | |

FOREIGN PATENT DOCUMENTS

052140  1/1993  European Pat. Off. .

OTHER PUBLICATIONS

Patent Abstracts of Japan, vol. 013, No. 007 (P810), 10 Jan. 1989 & JP 63 214615 A (Mitsubishi Precision Co Ltd), 07 Sep. 1988.

*Primary Examiner*—Samuel A. Turner
*Attorney, Agent, or Firm*—Lewis B. Sternfels

[57] ABSTRACT

A gyroscope assembly (10) includes a ring-shaped fiber optic coil (14) and a coil conforming enclosure (12, 16) of high magnetic permeability ferromagnetic material. The enclosure is ring-shaped to conform with the shape of the coil, and includes a portion (22) extending within the internal hole of the coil ring. Therefore, the coil is intimately and fully encased within high magnetic permeability material. In particular, the enclosure comprises a coil supporting spool (12) and a cover (16) secured to the spool. The spool includes a base (18) which is provided with a central hole (20) and a tubular wall (22) extending perpendicularly from the base. Coil (14) is bonded to base (18). Both the spool and the cover are formed of high magnetic permeability material, and the cover is placed about the fiber optic coil and attached to the spool. The coefficient of thermal expansion material used for the spool is matched to that of the coil pack to minimize stress imposed upon the fiber. An outer shield (28), roughly cylindrical in shape, may be further attached to the outside of the inner, toroidal shield, and the two shields are separated by a layer of low magnetic permeability material, such as of low magnetic permeability stainless steel or aluminum.

25 Claims, 2 Drawing Sheets

HIGH EFFICIENCY MAGNETIC SHIELD FOR A FIBER OPTIC GYROSCOPE

CROSS-REFERENCE TO RELATED APPLICATION

This application claims the benefit of U.S. Provisional Application No. 60/022,696, filed Jul. 26, 1996.

REFERENCE REGARDING FEDERAL SPONSORSHIP

Not applicable

REFERENCE TO MICROFICHE APPENDIX

Not applicable

1. Field of the Invention

The present invention relates to magnetic shielding of a body defining a closed path capable of conducting optical electromagnetic energy. Bodies defining such closed paths typically include optical gyroscopes, e.g., fiber optic and ring laser gyroscopes. The paths in fiber optic gyroscopes are formed by optical fiber sensor coils. The paths in ring laser gyroscopes may be formed by a polygonally arranged plurality of linearly shaped gain bores and reflectors strategically placed in the bores. Thus, a path does not necessarily encompass a circular ring, but may have some other curved or angular configuration; it is common in the optical gyroscope art to refer to all paths as rings. Accordingly, the ensuing discussion herein retains such meaning of the terms "ring" or "ring-shaped" as not being limited to a circular configuration.

2. Description of Related Art and Other Considerations

A key performance parameter for optical gyroscopes, such as fiber optic and similar optic gyroscopes used for inertial sensing, is bias sensitivity to magnetic fields. Sources of magnetic flux include the Earth's magnetic field, electrical machinery, etc. For a fiber gyroscope used in inertial navigation systems, the allowable magnetic sensitivity of the instrument bias is between 0.001 and 0.0001 deg/hr/gauss. The inherent sensitivity of an unshielded gyroscope is on the order of 1 deg/hr/gauss. This inherent sensitivity of the gyroscope is caused by a non-optimal spatial distribution of polarization state of light travelling around the coil, relative to the applied magnetic field, due to the natural twist behavior of the optical fiber. The most effective method to reduce the bias sensitivity to magnetic field is to reduce the magnitude of the local field by the addition of a magnetically shielding structure around the coil.

Fiber optic gyroscope sensor coils are conventionally wound onto a spool within the instrument. Typical spool materials include aluminum, silica glass and titanium. When magnetic shielding is employed, it is usually effected by means of a roughly cylindrically-shaped enclosure of high magnetic permeability material surrounding the coil. Practical magnetic field reduction achievable with this approach is limited to about 100 to 300 times, depending on the diameter, height, wall thickness and permeability of the enclosure and the orientation of the applied magnetic field.

The choice of spool material can also affect the bias of a fiber optic gyroscope during changes in ambient temperature. If the coefficient of thermal expansion of the spool is different from that of the coil pack, stress on the fiber can result, which can cause changes in the instrument bias. This is true with traditional spool materials, including aluminum.

SUMMARY OF THE INVENTION

These and other problems are successfully addressed and overcome by the present invention. Briefly, the fiber optic coil is intimately encased within a coil conforming enclosure of ferromagnetic material. Such intimate encasing includes a portion of the enclosure which extends within the central opening of the path forming structure. For example, for a coil the enclosure comprises a coil supporting spool itself and a cover secured thereto. Both the spool and the cover are formed of high magnetic permeability material, and the cover is placed about the fiber optic coil and attached to the spool. Thus, the conforming enclosure is shaped similarly as the coil or path; for a conventional coil of toroidal shape, the enclosure, including the spool, is similarly shaped as a hollow toroid.

In addition, the coefficient of thermal expansion of the material used for the spool is matched to that of the coil pack to minimize stress imposed upon the fiber.

An outer shield, roughly cylindrical in shape, may be attached to the outside of the inner, toroidal shield, and the two shields are separated by a layer of low magnetic permeability material, for example, of low magnetic permeability stainless steel or aluminum.

Several advantages are derived from the above construction. A tightly packaged, shielded optical path, e.g., disposed as an optical fiber coil, is produced, and can be easily manufactured. The shielding efficiency is improved and, for a coil, the magnetically shielding coil supporting spool serves the dual purpose both of supporting the coil and of acting as a magnetic shield.

Other aims and advantages, as well as a more complete understanding of the present invention, will appear from the following explanation of exemplary embodiments and the accompanying drawings thereof.

BRIEF DESCRIPTION OF THE DRAWINGS

FIG. 2, specifically, is a cross-sectional view of the embodiment shown in FIGS. 1 and 3, taken along line 2—2 of FIG. 3;

FIG. 2a, specifically, is distinguished from FIG. 2 in that in FIG. 2a non-adhesive matter exists between the coil and the tubular wall;

FIGS. 2b, specifically, is like FIG. 2a except that a space exists between the coil and the tubular wall;

FIG. 2c, specifically, is differentiated from FIGS. 2, 2a and 2b in that the tubular wall is secured to the cover, while the other figures show the tubular wall secured to the spool;

DETAILED DESCRIPTION

Figure 1:
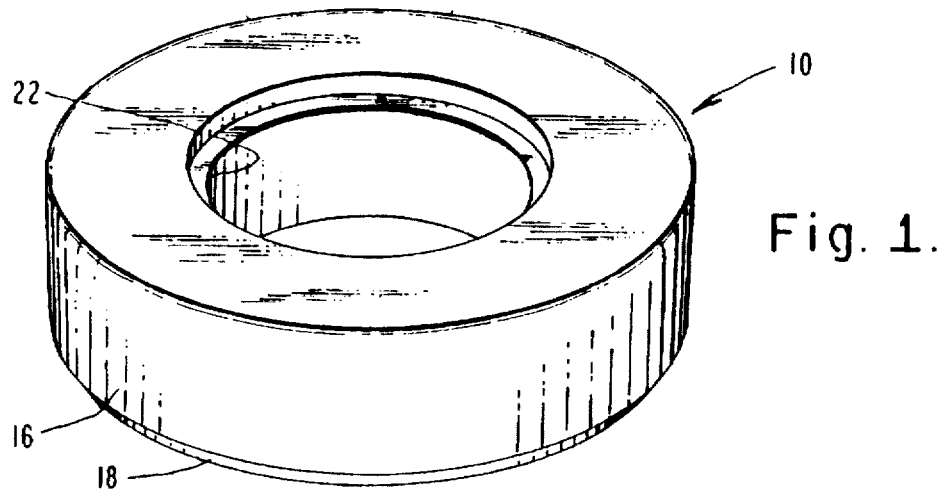
FIG. 1 is a perspective view of a preferred embodiment of the present invention.
Figure 2:
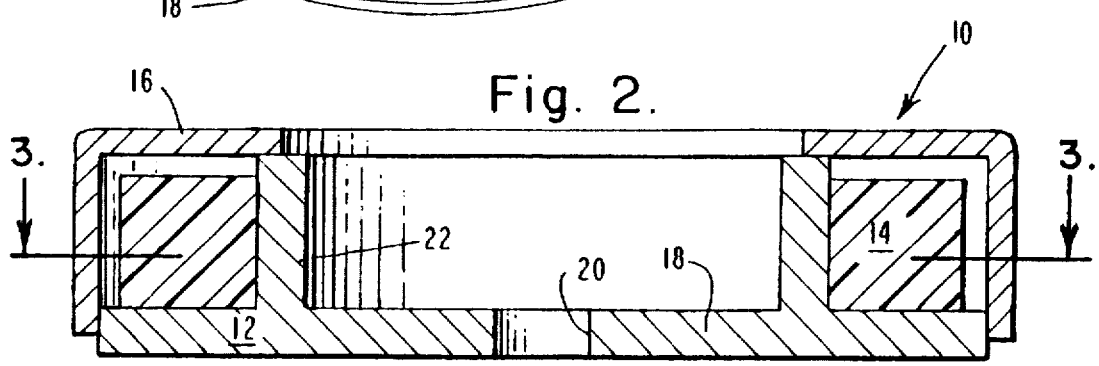
FIGS. 2, 2a, 2b and 2c, in general, are cross-sectional views of alternate embodiments of the invention, showing a fiber optic coil mounted on a spool, a cover secured thereto and a tubular wall on the interior of the coil, in which the spool, the cover and the tubular wall comprise a material or materials having high magnetic permeability.
Figure 3:
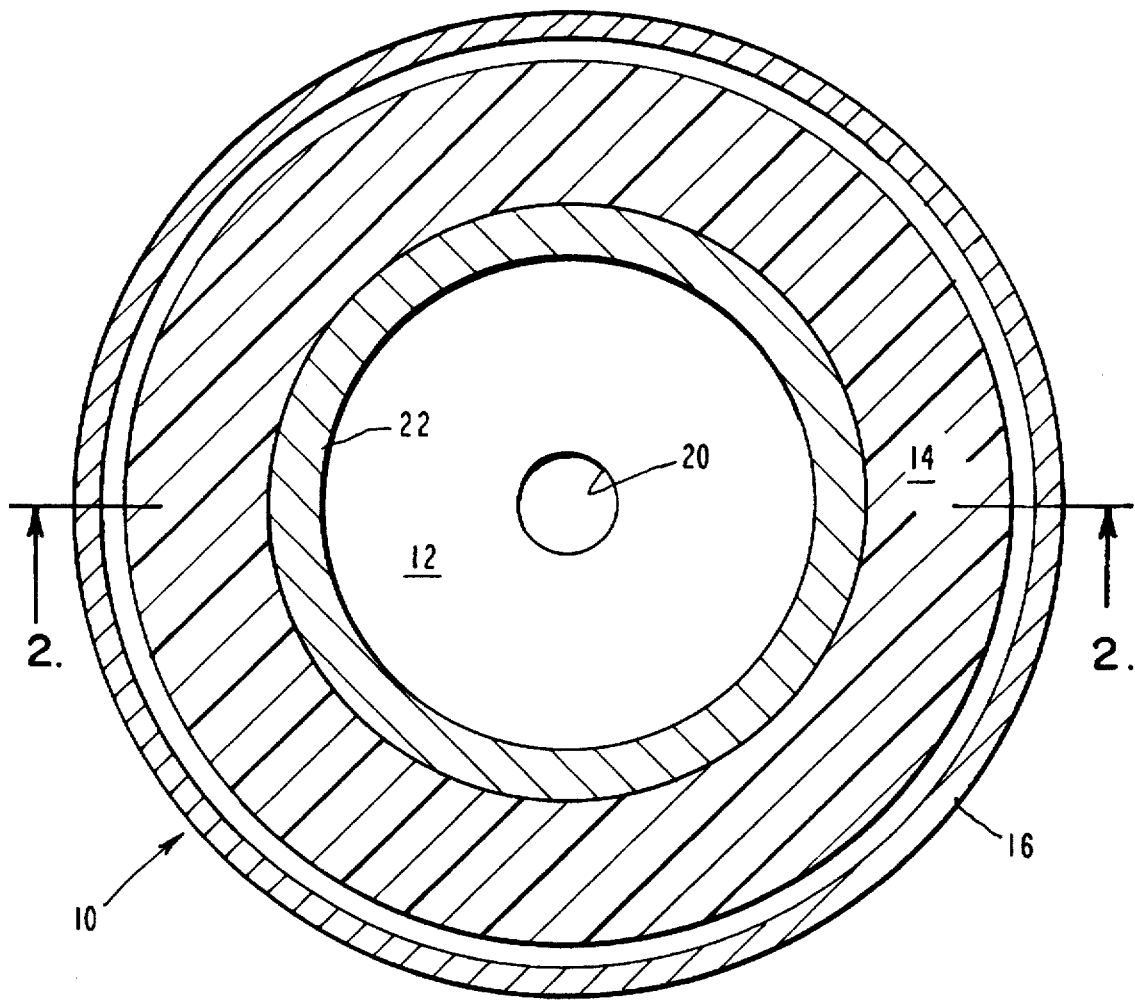
FIG. 3 is a cross-sectional view of the embodiment shown in FIG. 2, taken along line 3—3 thereof.

Referring to FIGS. 1–3, an assembly 10, 10a, 10b and 10c of a fiber optic gyroscope forms a case or enclosure for magnetically shielding a fiber optic gyroscope coil 14. Each assembly 10, 10a, 10b and 10c includes a spool 12 or 12', a coil 14 of optical fiber, and a cover 16 or 16'. Coil 14 comprises windings of optical fiber, and is of conventional construction. Both spool 12, 12' and cover 16, 16' are formed of a ferromagnetic material having high relative permeability ($\mu/\mu 0$). Preferred high permeability materials include alloys of Carpenter High Permeability "49"® and Carpenter HyMu "80"® (trademarks of Carpenter Technology Corporation) whose compositions are respectively a 48% nickel-iron alloy and an unoriented 80% nickel-iron-molybdenum alloy. In addition, the coefficient of thermal expansion of the material used for spool 12, 12' is matched to that of the coil pack to minimize stress imposed upon the fiber.

Figure 2A:
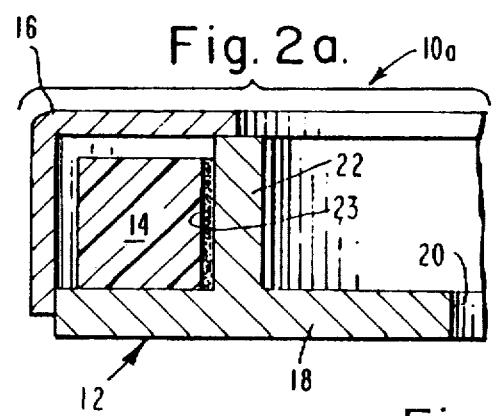
Figure 2B:
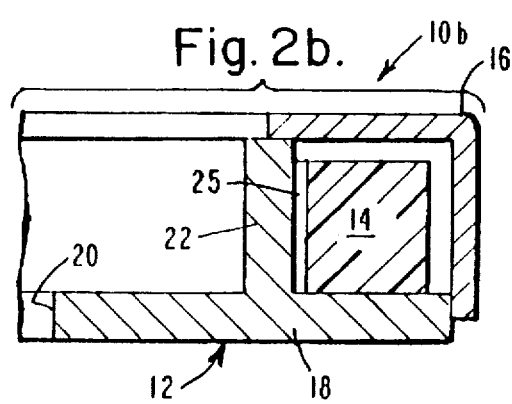

Spool 12, 12' includes a base 18, 18' which is provided with a central hole 20, 20'. In FIGS. 2, 2a and 2b, a tubular wall 22 extends perpendicularly upwards from base 18. Hole 20 forms an opening for receipt of a mounting bolt or other supporting means, to enable assembly 10, 10a and 10b to be mounted to a supporting structure. Coil 14 is bonded to base 18 by a suitable adhesive or the like of conventional composition.

Figure 2C:
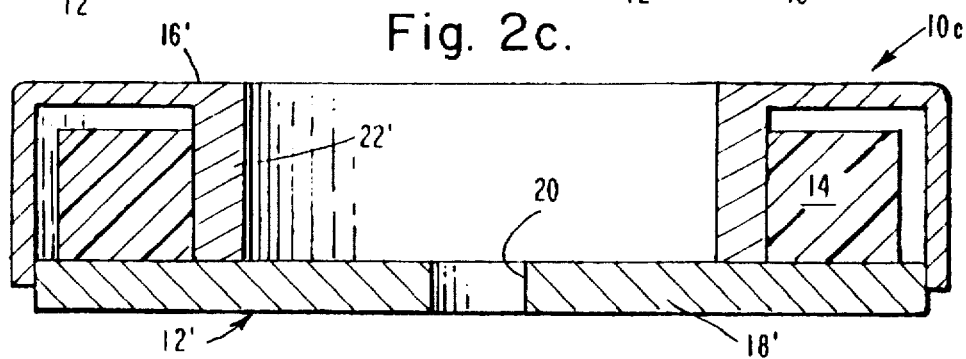

In FIG. 2c, a tubular wall 22' extends from a cover 16' rather than from the base; otherwise the structures of FIGS. 2, 2a and 2b and FIG. 2c are the same.

If desired, as shown in FIG. 2a, generally non-adhesive matter 23 may be disposed between said tubular wall 22 and coil 14. Such non-adhesive matter is characterized by a low coefficient of friction, and is described in U.S. Pat. No. 5,545,892 for the reasons given therein, and the disclosure in that patent is incorporated herein as if set forth in haec verba. Briefly, a spool for receiving the coil includes a single, substantially-planar mounting flange and a central hub. The coil can be directly wound upon the hub. The coil is mounted transverse to the plane of the mounting flange and is unconfined in that direction as the surface of the hub is substantially non-adhesive with respect to the inner layer of the coil. This allows axial coil expansion with increases in temperature without generating gyro bias errors.

Alternately, as shown in FIG. 2b, tubular wall 22 may be spaced from coil 14 as denoted by indicium 25. The use of space 25 is described in patent application, Ser. No. 08/526,725 for the reasons given therein, and the disclosure in that patent is incorporated herein as if set forth in haec verba.

Figure 4:
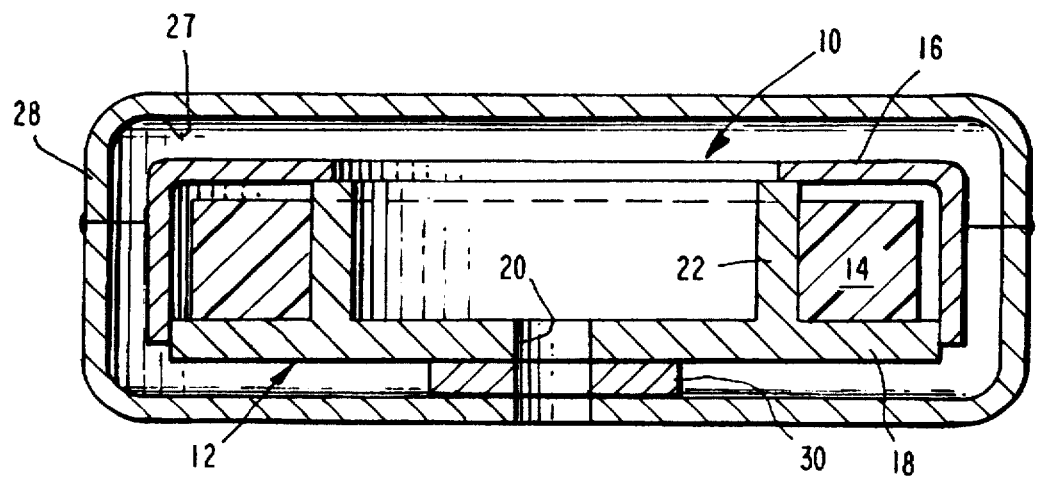
FIG. 4 is a view similar to that depicted in FIG. 2 with an additional outer case of high magnetic permeability magnetic material providing further magnetic shielding.

For extremely high shielding requirements, as shown in FIG. 4, an outer case 28, also of high permeability ferromagnetic material, is placed about assembly 10. A spacer 30 of low magnetic permeability material is placed between base 18 and outer case 28 and bonded thereto in any suitable manner, to separate spool 12 from outer cover 28 and to prevent any undesired magnetic coupling therebetween. Magnetically shielding case 28 (with cylindrical symmetry about the input axis of the gyroscope), used to further shield the coil, may include such materials as Carpenter HyMu "80"® and Carpenter High Permeability "49"®.

Although the invention has been described with respect to particular embodiments thereof, it should be realized that various changes and modifications may be made therein without departing from the spirit and scope of the invention.

What is claimed is:

1. An optical gyroscope assembly comprising:
    a body defining a closed path capable of conducting optical electromagnetic energy and being configured to include an interior opening surrounded by the path;
    a spool of ferromagnetic material having high relative permeability ($\mu/\mu 0$) supporting said body;
    a member of high relative magnetic permeability material ($\mu/\mu 0$) extending into said interior opening; and
    a cover of a ferromagnetic material having high relative permeability ($\mu/\mu 0$) disposed to form, with said spool and said member, a magnetically shielding enclosure for said body.

2. Apparatus according to claim 1 in which said body includes optical fibers wound into a ring-shaped configuration.

3. Apparatus according to claim 1 in which said body comprises a ring laser gyroscope.

4. Apparatus according to claim 1 wherein:
    said spool includes a base which is provided with a central hole and to which said body is secured,
    said member comprises a tubular wall extending perpendicularly between said base and said cover to form a ring-shaped enclosure with said spool and said cover; and
    said body comprises a fiber optic coil positioned within said enclosure and about said tubular wall for encasement by said high permeability material.

5. Apparatus according to claim 4 in which said coil is formed into a coil pack, and the material used for said spool has a coefficient of thermal expansion that is matched to the material of said coil pack to minimize stress imposed upon the fiber of said coil.

6. An assembly according to claim 4, in which said coil is bonded to said base.

7. Apparatus according to claim 4 in which said tubular wall is spaced from said coil.

8. Apparatus according to claim 4 in which generally non-adhesive matter is disposed between said tubular wall and said coil.

9. Apparatus according to claim 4 in which said tubular wall is secured to said base.

10. Apparatus according to claim 4 in which said tubular wall is secured to said cover.

11. In a fiber optic gyroscope, a magnetically shielded assembly comprising:
    a spool of a ferromagnetic material having high relative permeability ($\mu/\mu 0$) and including a base which is provided with a central hole;
    a cover of a ferromagnetic material having high relative permeability ($\mu/\mu 0$) and disposed to cover said spool;
    a tubular wall of a ferromagnetic material having high relative permeability ($\mu/\mu 0$) and extending perpendicularly between said base and said cover;
    said base, said cover and said tubular wall forming a ring-shaped enclosure of high relative permeability ($\mu/\mu 0$); and
    a ring-shaped fiber optic gyroscope coil positioned within said enclosure and about said tubular wall and supported by said spool for encasement by said high magnetic permeability material.

12. An assembly according to claim 11 in which said coil is formed into a coil pack, and the material used for said spool has a coefficient of thermal expansion that is matched to the material of said coil pack to minimize stress imposed upon the fiber of said coil.

13. An assembly according to claim 11 in which said tubular wall is secured to said spool.

14. An assembly according to claim 11 in which said tubular wall is secured to said cover.

15. An assembly according to claim 11 in which said tubular wall is spaced from said coil.

16. An assembly according to claim 11 further including generally non-adhesive matter disposed between said tubular wall and said coil.

17. An assembly according to claim 11 further including an outer case of a ferromagnetic material having high relative permeability ($\mu/\mu 0$) enclosing said ring-shaped enclosure.

18. Apparatus according to claim 1 in which said spool, said member and said cover all have a coefficient of thermal expansion that is matched to the material of said body to minimize thermal stress imposed thereupon.

19. An optical gyroscope assembly comprising:

a fiber optic coil having an interior opening;

an enclosure of ferromagnetic material shaped similarly as and fully encasing said coil, and extending within the interior opening, the material of said enclosure having a coefficient of thermal expansion that is matched to the material of said coil to minimize stress imposed thereupon.

20. An assembly according to claim 19 in which said enclosure comprises a coil supporting spool, a cover secured thereto and a tubular wall extending therebetween, said spool, said cover and said tubular wall being formed of high magnetic permeability material, with said cover being placed about said fiber optic coil and attached to said spool, and said tubular wall being disposed within said interior opening of said coil and in magnetically sealing contact with said cover and said spool.

21. In an optical gyroscope including a body defining a closed path capable of conducting optical electromagnetic energy and being configured to include an interior opening surrounded by the path, a spool supporting the body and a cover covering the body, a method for magnetically shielding the body comprising the steps of placing a member within the interior opening, constituting the spool, the member and the cover of magnetic permeability material for completely surrounding the body with the magnetic permeability material.

22. A method according to claim 21 wherein the body defining the closed path comprises a ring-shaped optical fiber coil, further comprising the step of configuring the magnetic permeability material as a ring-shaped enclosure which intimately and fully encases the coil.

23. A method according to claim 22 further comprising the step of housing the body and the enclosure with an outer case of a ferromagnetic material having high relative ($\mu/\mu 0$) permeability.

24. A method according to claim 21 wherein the body defining the closed path comprises a ring laser gyroscope.

25. A method according to claim 24 further comprising the step of housing the body and the enclosure with an outer case of a ferromagnetic material having high relative ($\mu/\mu 0$) permeability.

* * * * *